(12) United States Patent
Zlotnick et al.

(10) Patent No.: US 10,992,676 B2
(45) Date of Patent: Apr. 27, 2021

(54) LEVERAGING BLOCKCHAIN TECHNOLOGY FOR AUDITING CLOUD SERVICE FOR DATA PROTECTION COMPLIANCE

(71) Applicant: EMC IP Holding Company LLC, Hopkinton, MA (US)

(72) Inventors: David Zlotnick, Tel Aviv (IL); Assaf Natanzon, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/249,791

(22) Filed: Jan. 16, 2019

(65) Prior Publication Data
US 2020/0228530 A1    Jul. 16, 2020

(51) Int. Cl.
| H04L 29/06 | (2006.01) |
| H04L 9/32 | (2006.01) |
| H04L 9/06 | (2006.01) |
| G06F 16/11 | (2019.01) |
| G08G 1/133 | (2006.01) |

(52) U.S. Cl.
CPC ............ *H04L 63/10* (2013.01); *G06F 16/122* (2019.01); *H04L 9/0637* (2013.01); *H04L 9/321* (2013.01); *H04L 63/308* (2013.01); H04L 2209/38 (2013.01)

(58) Field of Classification Search
CPC ..... G08G 1/133; H04L 9/0637; H04L 9/0643; G06Q 20/0655
USPC ........ 709/204, 217, 224, 225; 713/165, 168, 713/170, 171; 726/5, 26, 29
See application file for complete search history.

(56) References Cited

U.S. PATENT DOCUMENTS

| 10,121,025 B1 | 11/2018 | Rice |
| 10,419,209 B1 * | 9/2019 | Griffin .................... H04L 9/006 |
| 2002/0196685 A1 | 12/2002 | Topham |
| 2017/0046651 A1 | 2/2017 | Lin et al. |
| 2018/0018723 A1 | 1/2018 | Nagla et al. |
| 2018/0082024 A1 | 3/2018 | Curbera et al. |
| 2018/0082296 A1 | 3/2018 | Brashers |
| 2018/0285479 A1 * | 10/2018 | Mackay .............. G06F 21/6218 |
| 2018/0285839 A1 * | 10/2018 | Yang .................. G06Q 20/0655 |
| 2020/0021446 A1 | 1/2020 | Roennow et al. |

(Continued)

FOREIGN PATENT DOCUMENTS

WO     2018089843     5/2018

OTHER PUBLICATIONS

"Towards Blockchain-Driven, Secure Transparent Audit Logs"—Ahmad et al, Univ. of Central Florida, Nov. 25, 2018 https://arxiv.org/pdf/1811.09944.pdf (Year: 2018).*

(Continued)

*Primary Examiner* — Randy A Scott
(74) *Attorney, Agent, or Firm* — Workman Nydegger

(57) ABSTRACT

One example method includes receiving, at a blockchain node of an auditing cloud service, information associated with one or more data management transactions, registering, at the blockchain node, the information received concerning the data management transactions, receiving, by the cloud auditing service, a request for access to the information registered at the blockchain node, and, enabling, by the cloud auditing service, access to the requested information.

18 Claims, 4 Drawing Sheets

(56) References Cited

U.S. PATENT DOCUMENTS

2020/0067697 A1    2/2020  Puddu et al.
2020/0394652 A1*  12/2020  Youb .................... G06F 21/64

OTHER PUBLICATIONS

U.S. Appl. No. 16/249,761, filed Jan. 16, 2019, David Zlotnick, et al.
U.S. Appl. No. 16/249,783, filed Jan. 16, 2019, Assaf Natanzon, et al.
Gipp et al., "Decentralized Trusted Timestamping using the Crypto Currency Bitcoin", Mar. 2015, National Institute of Informatics Tokyo, from the Proceedings of the iConference 2015—Newport Beach, CA, accessed via <http://ischools.org/the-iconference>, pp. 1-6.
International Search Report and Written Opinion for PCT/US2019/053874 dated Nov. 29, 2019.
International Search Report and Written Opinion for PCT/US2019/053879 dated Nov. 28, 2019.
International Search Report and Written Opinion for PCT/US2019/054574 dated Dec. 20, 2019.
Sutton et al., "Blockchain Enabled Privacy Audit Logs," Oct. 4, 2017, McMaster University, DOI: 10.1007/978-3-319-68288-4_38, pp. 1-17, accessed via <https://www.researchgate.net/publication/320203888>.

* cited by examiner

LEVERAGING BLOCKCHAIN TECHNOLOGY FOR AUDITING CLOUD SERVICE FOR DATA PROTECTION COMPLIANCE

RELATED APPLICATIONS

This application is related to U.S. patent application Ser. No. 16/249,761, entitled BLOCKCHAIN TECHNOLOGY FOR REGULATORY COMPLIANCE OF DATA MANAGEMENT SYSTEMS, filed the same day herewith. This application is related to U.S. patent application Ser. No. 16/249,783, entitled BLOCKCHAIN TECHNOLOGY FOR DATA INTEGRITY REGULATION AND PROOF OF EXISTENCE IN DATA PROTECTION SYSTEMS, filed the same day herewith. All of the aforementioned applications are incorporated herein in their respective entireties by this reference.

FIELD OF THE INVENTION

Embodiments of the present invention generally relate to data protection. More particularly, at least some embodiments of the invention relate to systems, hardware, software, computer-readable media, and methods for facilitating audits of data management systems and processes for regulatory compliance.

BACKGROUND

Increasingly, the handling of user data by storage systems and data management systems is governed by various regulatory requirements, including those set by governments concerning security and privacy, such as the General Data Protection Regulation (GDPR) issued by the European Union (EU). As well, the handling of user data is controlled, in some instances at least, by organizations such as the Securities and Exchange Commission (SEC). Yet other bodies have promulgated still other rules and regulations concerning the handling of user data.

Such regulatory requirements may present challenges to enterprises and other entities and organizations involved in creating and handling data. As well, such requirements change between industries and verticals, are different in each country/state, and continuously change in time. This further complicates the ability of an enterprise, for example, to comply, and prove compliance, with the applicable regulations.

Particularly, organizations may be required to provide a certification that their data management systems comply with the applicable regulatory requirements. This is typically done by way of auditing processes in which external auditors inspect the organization's data management implementation, policies and history.

Unfortunately, certification of data management systems is a complex, lengthy and costly process, as it involves manual inspection of large amounts of data distributed between many diverse information systems. Organizations are thus faced with the challenge, among others, of providing a unified reliable data source that will serve as legal proof-of-record for data management regulatory compliance certification.

In more detail, problems and complicating factors that organizations must deal with include a complex, and dynamic, regulatory environment, multiple different data management systems, and complex and costly certification processes. With regard to regulation for example, it is difficult for users, IT managers and business owners to keep abreast of the latest regulation, common practices and industry requirements in their field regarding data retention, protection, and security. In a related vein, it can be difficult for organizations to verify their compliance, and also verify that the changes in regulation do not require changes to their data protection policy.

As well, data volumes and variety are growing exponentially and require an auditor need to access and review multiple diverse systems in the organization. Finally, certification processes for regulatory compliance are often manual, time consuming and costly, due to the presence of multiple distributed data systems and a lack of adequate automation tools.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
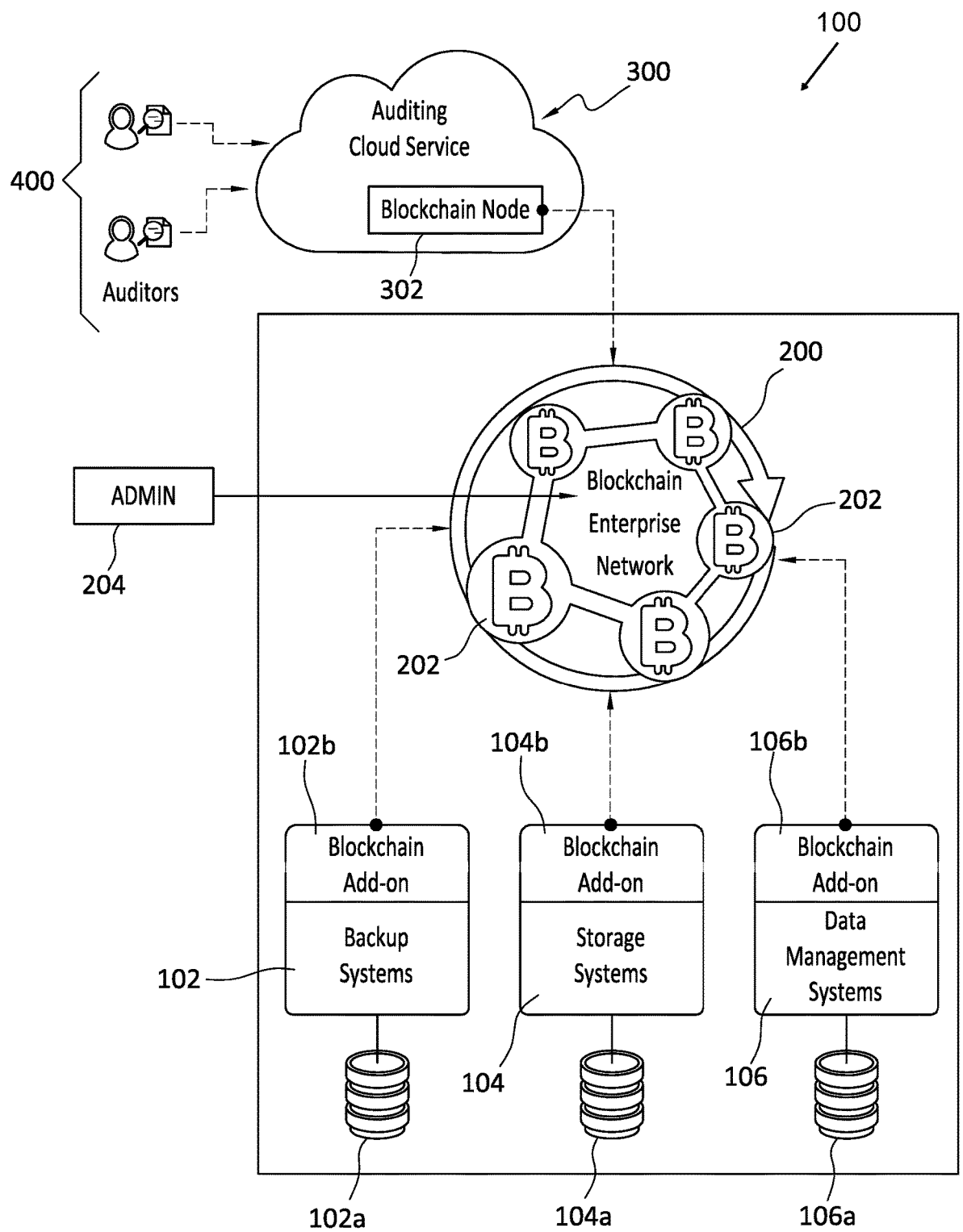
FIG. 1 discloses aspects of an example operating environment for some embodiments of the invention.

Embodiments of the present invention generally relate to data protection. More particularly, at least some embodiments of the invention relate to systems, hardware, software, computer-readable media, and methods for facilitating audits of data management systems and processes for regulatory compliance.

More particularly, example embodiments of the invention leverage blockchain technology to expose an auditing cloud service by a dedicated node that is accessible by one or more third parties. This approach may transform and simplify an audit process for regulatory compliance of data protection systems. At least some embodiments within the scope of the invention are based on logging regulated data protection and data management transactions in the organization on a blockchain network. Logging of the transactions creates a secure, encrypted and non-editable legal proof-of-record ledger. This blockchain network can then be connected to an auditing cloud service that may be used as a single, transparent and standard access point for auditors and regulators to review and verify the regulatory compliance of the organization or enterprise.

Correspondingly, some example embodiments of the invention embrace an enterprise blockchain network that is constructed from blockchain software plugins to existing storage systems, data protection systems and data management systems in the organization. By adding a blockchain software plugin to these systems, those systems become nodes in the enterprise blockchain network.

For each relevant data management operation that takes place on these systems, the transaction metadata will be registered as a block on the blockchain network. Such metadata may include, for example, attributes such as: date and time of the transaction; transaction id; data management system id; data protection policy relating to data implicated by the transaction; physical location of the data; and, proof of data deletion for data delete operations.

For performance considerations, a group of one or more data management transactions can be aggregated to a single blockchain data block, based on configurable parameters concerning consolidation logic for the transactions. For example, it may sometimes be the case that publishing transactions, on an individual basis, to the blockchain network may not be practical due to the volume of transactions. To illustrate, if there are multiple storage transactions, or backup transactions, per second, it may be more efficient to periodically aggregate the transactions and then send the metadata for the aggregated transactions to the blockchain network at the same time. Thus, parameters that may be considered when determining whether, and how, to aggregate data management transactions may include, but are not limited to, and the number of data management transactions per block, the maximum rate of blocks that can be created per minute. These parameters are provided only by way of example, and other parameters may be used to inform aggregation methods.

Advantageously then, some embodiments of the invention may provide various benefits and improvements relative to the configuration and operation of conventional hardware, software, systems and methods. To illustrate, an embodiment of the invention may provide processes for configuring an enterprise network having multiple nodes to operate as a blockchain network, at least with respect to data management operations. This approach is an improvement in functionality and operation over conventional computing systems and processes that do not employ a secure, encrypted, and non-editable, legal proof-of-record ledger for recording data management transactions.

As well, some embodiments of the invention may provide for an auditing functionality in which a third party is able to access and evaluate, by way of an auditing cloud service of an enterprise, data management transactions effected by the enterprise and registered in a blockchain network. Among other reasons, this approach is advantageous inasmuch as the enterprise that has generated the data management transactions is prevented from modifying the transactional information in any way, thus ensuring that an auditor is able to access a true and complete record of the data management transaction as it actually occurred. Thus, the data management transactions are highly transparent. As such, embodiments of the invention are not limited to auditing processes. For example, access to data management transaction information can be used to identify, and aid in the resolution of, system, hardware, and/or software, problems.

Another advantage of some embodiments is that they enable new processes for verifying customer compliance with applicable regulations, while also improving a customer experience at the enterprise, and for auditors. Thus, auditors and/or other third parties are able to access enterprise information that was not readily available before. As well, the accuracy, usefulness, and timeliness, of data management transaction audit results may be improved by embodiments of the invention. Finally, embodiments of the invention are advantageous inasmuch as they provide for blockchain-enabled data protection software, hardware, and systems.

It should be noted that the foregoing advantageous aspects of various embodiments are presented only by way of example, and various other advantageous aspects of example embodiments of the invention will be apparent from this disclosure. It is further noted that it is not necessary that any embodiment implement or enable any of such advantageous aspects disclosed herein.

A. Aspects of an Example Operating Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, and disaster recovery operations. Thus, while the discussion herein may, in some aspects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with data backup and restore platforms such as the Dell-EMC NetWorker and Avamar platforms.

A data protection environment may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

With particular attention now to FIG. 1, an operating environment 100 may comprise, or consist of, a data protection environment. The data protection environment can include an enterprise datacenter, or a cloud datacenter, or both. The data protection environment may support various data protection processes, including data replication, data deduplication, cloning, data backup, and data restoration, for example. As used herein, the term backups is intended to be construed broadly and includes, but is not limited to, partial backups, incremental backups, full backups, clones, snapshots, continuous replication, and any other type of copies of data, and any combination of the foregoing. Any of the foregoing may, or may not, be deduplicated.

In general, the example configuration in FIG. 1 discloses an enterprise blockchain network connecting storage, backup, and data management, systems in an organization. Also disclosed in FIG. 1 are cloud service connectivity for third parties, such as auditors for example. This example embodiment enables the third parties to access all data management compliance information from the blockchain network.

As particularly indicated in FIG. 1, the operating environment 100 may include various data protection systems, components, and software, such as a backup system 102, storage system 104, and data management system 106, which may be referred to generally herein as data management elements or, in some particular embodiments, as data protection elements. One or more of these data management elements may be an out-of-the-box element, that is, hardware and/or software purchased from a vendor, such as Dell-EMC for example.

The aforementioned data management elements may all be associated with a single common enterprise or organization, but that is not required and, in other embodiments, multiple different enterprises or organizations can include data protection elements such as those indicated in FIG. 1. As well, the data management elements may each comprise, or consist of, hardware and/or software. Each of the data management elements 102 through 106 may comprise, or have access to, respective storage facilities 102a, 104a, and 106a, such as databases for example, that are able to support read/write/delete operations associated with the operation of the data protection elements 102, 104, and 106.

The backup system 102, storage system 104, data management system 106, may each include a respective extension 102b, 104b, and 106b, that, in general, enable those data management elements to interact with a blockchain network 200, as discussed below. Any of the extensions 102b, 104b, and 106b, may be provided as part of an out-of-the-box hardware/software installation. As well, any of the extensions 102b, 104b, and 106b, may comprise, or consist of, a blockchain plugin/API. Each of the backup system 102, storage system 104, and data management system 106, can use its respective extension 102b, 104b, and 106b, to interact with the blockchain network 200, even if those data protection elements are not fully qualified nodes on the blockchain network 200.

In general, and as discussed in further detail herein, each of the data management elements may communicate data transaction information to the blockchain network 200. Moreover, data management elements can be added to, or removed from, the operating environment 100 at any time. This may occur when for example, a data management element is removed from service, or replaced with another data protection element. There is no limit to the number of data management elements that may operate in connection with the blockchain network 200.

As further indicated in FIG. 1, and discussed in more detail elsewhere herein, the blockchain network 200 may be configured to communicate not only with one or more data management entities of an enterprise, but also with various external entities as well. The external entities may, or may not, be associated with the enterprise. For example, the blockchain network 200 may be accessible by a service, such as an auditing cloud service 300, which may be accessed by a third party auditor, such as a government auditor, so that the auditor can make various determinations concerning the handling of data by the data management elements 102, 104, and 106, of the enterprise. The auditing cloud service 300 may comprise a node 302 of the blockchain network 200. As such, data management transactions effected by the data management elements 102, 104, and 106 may be registered on the node 302. The node 302 may be an off-site node, that is, the node 302 may be located off-site from the enterprise. Thus, access to the ledger may be obtained by way of the node 302 of the auditing cloud service 300.

This arrangement, in which the blockchain network is connected to the auditing cloud service 300, may provide a variety of benefits. For example, storage of the enterprise data management operations on a trusted off-site node can provide assurance of a high level of availability of data management operation information to the enterprise. As another example, the auditing cloud service 300 may serve as a central access point for external auditors performing certification processes since, in some embodiments, each blockchain node may retain the entire transaction history for all data management elements of the enterprise.

Either, or both, of the auditing cloud service 300, and the blockchain network 200, can be implemented in a wide variety of forms, or combination of forms. Such forms include, but are not limited to, as a dedicated stand-alone server, a VM, an appliance in a data protection infrastructure, a virtual appliance in an enterprise data protection network, a rack/box in a datacenter, software, or integrated together with a data protection product.

With continued reference to FIG. 1, the auditing cloud service 300 may be accessible to one or more auditors and/or regulators, 400. In this way, the auditors 400 are able to access data management transaction information that has been registered on the node 302 of the auditing cloud service 300. An auditor 400 may be an auditor internal to the enterprise, or an external auditor not otherwise associated with the enterprise. An auditor 400 may be able to view, copy, or download data management transaction information, which may be encrypted, by way of the auditing cloud service 300.

In at least some embodiments, an auditor 400 is not able, due to security measures and/or other measures, to modify data management transaction information, such as by writing or deleting, accessed by way of the auditing cloud service 300. Further, an auditor 400 may be required to present suitable credentials, such as by way of a user interface (UI) of the auditing cloud service 300, in order to establish that the auditor 400 is authorized to access the data management transaction information. Upon presentation of the appropriate credentials, the auditor 400 may be granted access to the data management transaction information by the auditing cloud service 300. After authorization, if granted, the auditor 400 may be provided with a key to decrypt the data management transaction information provided by the auditing cloud service 300.

Access to the data management transaction information of the auditing cloud service 300 may be granted to auditors 400 on various bases, for example on an ad hoc basis, or on an ongoing basis. As well, various notifications may be sent between the auditing cloud service 300 and one or more of the auditors 400. One example is a notification from the auditing cloud service 300 that a particular set or group of data management transactions have been completed and are ready for auditing.

The auditors 400 may, such as by way of a UI, specify to the auditing cloud service 300 various parameters, which may collectively define an audit profile. In this way, the auditors 400 can use the audit profile to identify the data management transactions that are to be audited. The auditing cloud service 300 may then make available to the auditors 400 the record(s) that fall within the scope of the audit profile. Any parameter(s) can be used in the audit profile. Such parameters may include, but are not limited to, any grouping of the metadata generated in connection with a data management transaction such as, for example, the identity of the data management element that implemented the data management transaction, the type of data management transaction implemented, and a timeframe of interest. Thus, one example audit profile may specify: (i) all data backups; (ii) performed by data management element 'X'; (iii) within the last 30 days. It will be appreciated that any number of audit profiles may be defined and employed and, as such, the foregoing are presented only by way of example and not limitation.

B. Blockchain Network

With continued reference to FIG. 1, further details are provided concerning example blockchain networks that may be employed in connection with one or more embodiments of the invention, where one such example blockchain network has been denoted at 200. In general, and as noted elsewhere herein, one or more embodiments employ a blockchain network that is constructed from blockchain software plugins to existing storage systems, data protection systems and data management systems in the organization. By adding a blockchain software plugin such as, for example, the extensions 102*b*, 104*b*, and 106*b*, to these systems they will become nodes in the blockchain network 200.

The blockchain network 200 may comprise, or consist of, a plurality of host devices, each of which may be a respective node 202 of the blockchain network 200. In other embodiments, multiple nodes 202 of the blockchain network 200 may reside on, or otherwise be associated with, a single host device. More generally, the blockchain network 200 need not have any particular form or configuration, and the foregoing are thus presented only by way of example. The nodes 202 collectively define a ledger that holds information concerning all of the enterprise transactions. That is, all of the data management transactions are registered on all of the nodes of the network, including node 302. The ledger may receive transaction information that includes a tag or other identifier, identifying the source data management element involved in the transaction.

The blockchain network 200 may additionally include an administrator 204. The administrator 204 may be attached to any of the nodes 202 of the blockchain network 200. The administrator 204 may also communicate with external entities and nodes, such as an auditing cloud service 300. In some embodiments, the administrator 204 handles incoming data management transaction metadata, as well as requests to access data in the ledger.

In at least some embodiments, the blockchain network 200 comprises an enterprise blockchain network and, as such, is not accessible by public entities, or entities that have not been authorized for access by the enterprise. Thus, the data transaction information in an enterprise blockchain network is not generally accessible to the public, but may be accessible to authorized third parties such as auditors for example. Such a blockchain network may be referred to as a permissioned, or private, blockchain network.

In other embodiments, a blockchain network may be a public blockchain network freely accessible by one or more public entities, as well as by the enterprise. Such public blockchain networks may also be referred to as open, or permissionless, blockchain networks.

In yet further embodiments, a blockchain network may be a consortium blockchain network. A consortium blockchain network may include one or more nodes, each of which is associated with a respective entity or enterprise. Access to the consortium blockchain network nodes may be controlled by the respective entities associated with those nodes and/or by an administrator designated by the entities.

In terms of its operation, embodiments of a blockchain network, such as the blockchain network 200 for example, comprise a distributed ledger that can be used to record transactions between two or more parties. The ledger is accessible by any authorized party of a private blockchain network, or by any party in the case of a public blockchain network. Thus, embodiments of the blockchain network take the form of a peer-to-peer network whose members, or nodes, each adhere to established protocols for communication and the handling of transactions among members, such as the creations of new blocks in the blockchain. In at least some embodiments, the blockchain records in the ledger cannot be modified except with the consensus of all parties to a transaction.

In general, and by way of illustration, each data management operation, such as for a data object, constitutes a data transaction that results in the creation, by the blockchain network, of a corresponding block in a blockchain. Each block may be considered as an entry in the blockchain ledger. In at least some embodiments, a respective ledger may be provided for each node of the blockchain network and, as such, all data transactions from an entity such as data management element 102, which are directed to a node specific to that data management element 102, may be registered in a single ledger. In this way, an auditor, for example, can perform an entity-specific audit of the enterprise to which the data management element 102 belongs. The foregoing is presented only by way of example however, and ledgers can be assigned and employed in any other suitable way.

It should be noted that, in at least some embodiments, the actual data of the enterprise or other entity is not stored in the blockchain network 200. Rather, only the transactional information concerning that data resides in the blockchain network 200. The actual data of the enterprise can be stored locally at the enterprise site, and/or at a cloud datacenter, and/or other sites.

C. General Aspects of Example Blockchain Transactions

With continued reference to the discussion of FIG. 1 and blockchain networks, further details are provided now concerning aspects of the operation of a blockchain network such as the example blockchain network 200. In general, for each relevant data management operation that takes place on the enterprise data management elements, the transaction meta-data will be registered as a block on the blockchain network. As used herein, the term 'transaction' is intended broadly and embraces, among other things, any operation, or group of operations, affecting data that is managed by an enterprise or other entity. Such operations include, but are not limited to, data protection operations. With this in view, metadata associated with a transaction may include, but is not limited to, attributes such as: date and time of a data transaction; a transaction id; a data management system id of a data management system that performs, and/or causes the performance of, the transaction; a data protection policy associated with the data; physical location of the data; and, proof of deletion for delete operations, and/or proof of any other data management operation. In some embodiments, performance may be enhanced by aggregating several data management transactions to a single blockchain data block, based on configurable parameters.

As the present disclosure thus makes clear, the blockchain network 200 can serve as a unified source of truth for all data management transactions in the organization, for the purpose of regulatory compliance certification and/or other purposes. As well, storing the data protection operations on the blockchain network 200 leverages the blockchain capabilities as an implementation of a distributed ledger technology, that is secure, encrypted, immutable, that is, non-editable, and transparent.

D. Example Host and Server Configurations

Figure 2:
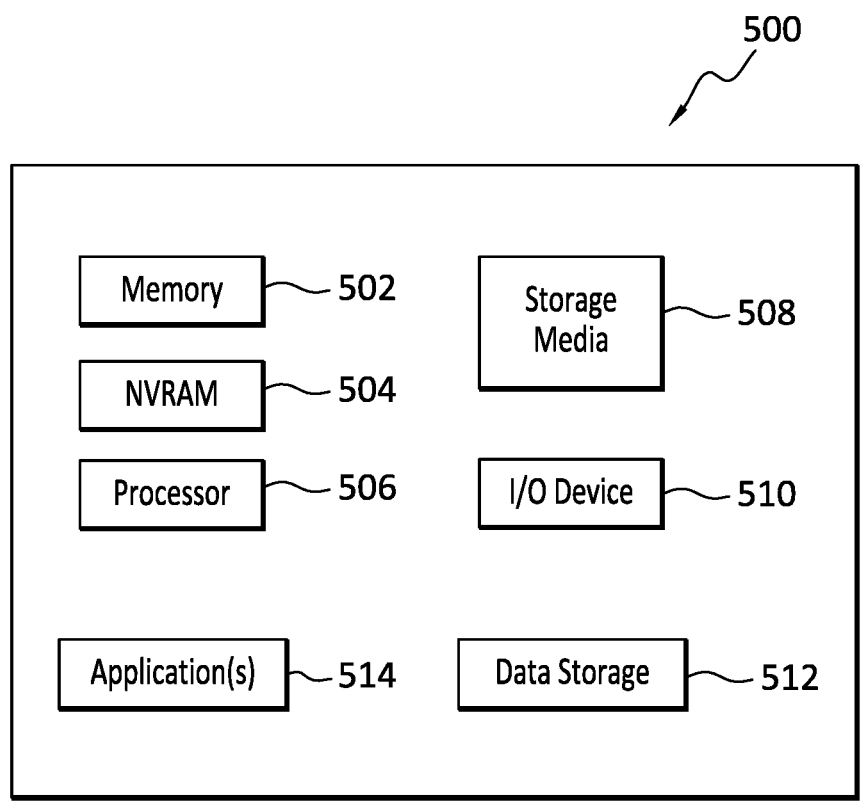
FIG. 2 discloses aspects of an example host configuration.

With reference briefly now to FIG. 2, any one or more of the data management elements 102 . . . 106, storage facilities 102a, 104a, and 106a, extensions 102b, 104b, and 106b, nodes 202, node 302, administrator 204, cloud auditing service 300, and auditors 400, can take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 2.

In the example of FIG. 2, the physical computing device 500 includes a memory 502 which can include one, some, or all, of random access memory (RAM), non-volatile random access memory (NVRAM) 504, read-only memory (ROM), and persistent memory, one or more hardware processors 506, non-transitory storage media 508, I/O device 510, and data storage 512. One or more of the memory components 502 of the physical computing device 500 can take the form of solid state device (SSD) storage. As well, one or more applications 514 are provided that comprise executable instructions. Such executable instructions can take various forms including, for example, instructions executable to perform any method or portion thereof disclosed herein, and/or executable by/at any of a storage site, whether on-premised at an enterprise, or a cloud storage site, client, datacenter, backup server, blockchain network, or blockchain network node, to perform functions disclosed herein. As well, such instructions may be executable to perform any of the other operations disclosed herein including, but not limited to, read, write, backup, and restore, operations and/or any other data protection operation, auditing operations, cloud service operation, blockchain operations, data management element operations, blockchain node operations, and blockchain ledger operations.

E. Example Methods

Figure 3:
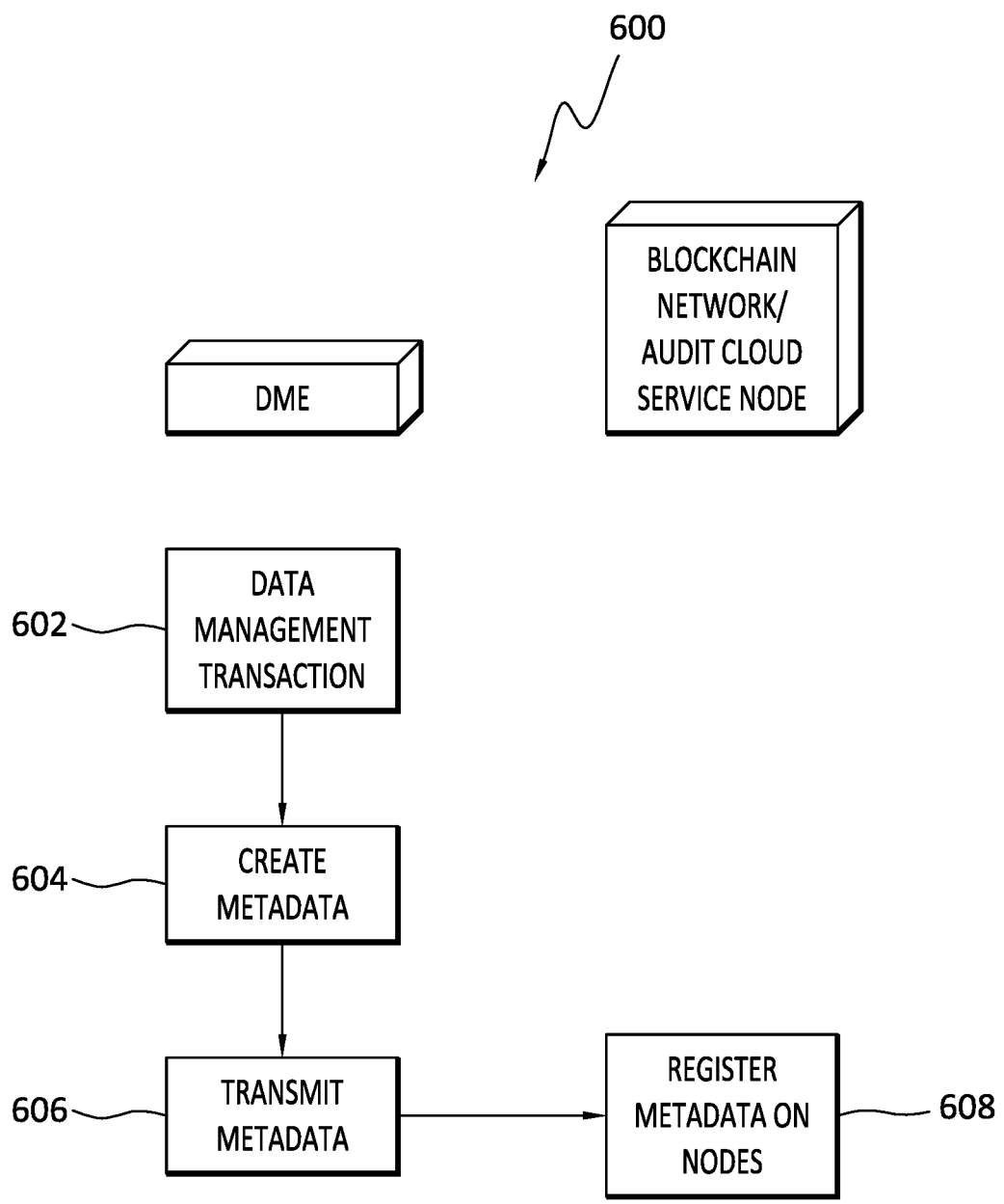
FIG. 3 is a flow diagram that discloses some general aspects of a method for handling information in connection with an auditing cloud service.

With attention now to FIG. 3, aspects of example methods are disclosed. One particular method is denoted generally at 600 and concerns operations involving an auditing cloud service and a blockchain network.

The method may begin at 602 wherein a data management element implements, or causes the implementation of, a data management transaction, such as a backup operation for example. In connection with the implementation of the data management transaction, the data management element may generate 604 metadata concerning the data management transaction. Such metadata may include, for example, attributes such as: date and time of the start and/or completion of the transaction; transaction id; data management system id; data protection policy relating to data implicated by the transaction; physical location of the data; and, proof of data deletion for data delete operations.

After generation of the metadata 604, the metadata is then transmitted 606, or otherwise made available, by the data management element to the nodes of a blockchain network, including the node of the auditing cloud service. The metadata is then registered 608 on each of the nodes of the blockchain network. In this way, an entity that connects to the auditing cloud service may access the transaction metadata that has been registered at the node of the auditing cloud service.

The node of the auditing cloud service may be designated as such at any time, and/or may be so designated as part of the method 600. In some embodiments, the node of the auditing cloud service is implemented as part of the creation of the blockchain network. In other embodiments, the node of the auditing cloud service is implemented after creation of the blockchain network, and then the other nodes of the blockchain network may be connected to the node of the auditing cloud service. The auditing cloud service may include a blockchain plugin or API gateway, for example, to enable the auditing cloud service to act as, or implement, a node of the blockchain network.

Figure 4:
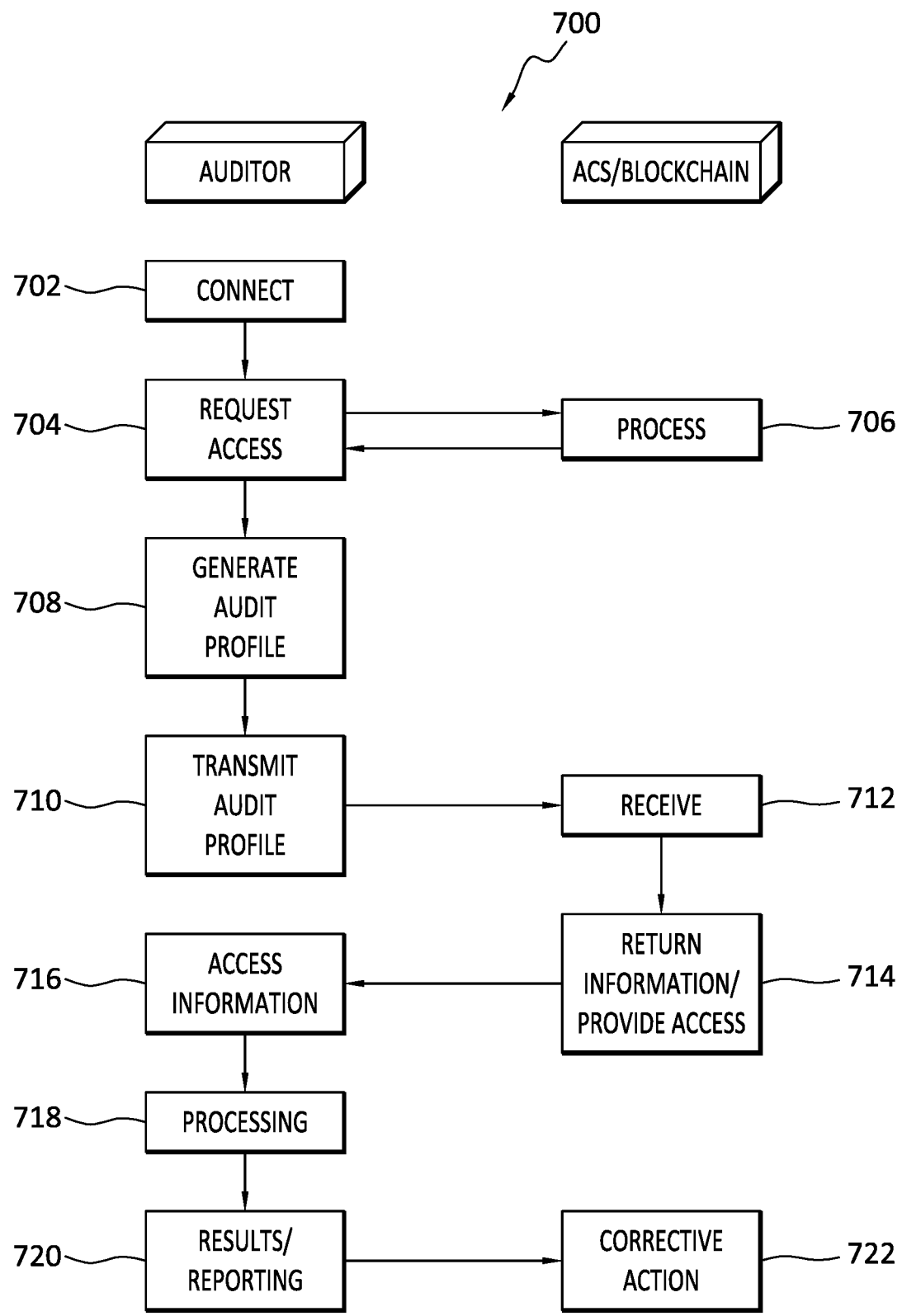
FIG. 4 is a flow diagram that discloses some general aspects of a method for auditing enterprise management transactions by way of an auditing cloud service.

With reference next to FIG. 4, aspects of still other example methods are disclosed. One particular method is denoted generally at 700 and concerns operations performed in connection with an auditing process. In some embodiments, the method 700 may be cooperatively performed by an auditing cloud service and one or more auditors, although the scope of the invention is not limited to the example functional allocation illustrated in FIG. 4. The method 700 may be repeated each time an audit is performed. As well, functions attributed in FIG. 4 to the auditing cloud service and/or blockchain may be performed by an auditing cloud service administrator, a blockchain network administrator, cooperatively by both of these administrators, or distributed between an auditing cloud service administrator and a blockchain network administrator. Thus, the allocation of functions in FIG. 4 is presented only by way of example, and not limitation. Finally, the method 700 may be combined with the method 600 to define still other processes. For example, the processes performed by the blockchain network and/or auditing cloud service in the method 600 may be combined with the processes performed by the blockchain network and/or auditing cloud service in the method 700 to define a further method.

The method may begin at 702 where an auditor connects to an auditing cloud service that includes a dedicated node that is part of a blockchain network. Any, or all, of the auditing cloud service, auditor, and dedicated node, may be located offsite from the enterprise, or other organization, that generates the metadata that is registered at the nodes of the blockchain network. After connecting to the auditing cloud service 702, the auditor may then request access 704 to the records of the blockchain network. As noted elsewhere herein, the records may comprise, or consist of, metadata concerning one or more data management transactions.

The request for access 704 may be processed 706 by a blockchain administrator and/or an auditing cloud service administrator. This processing 706 may include, for example, examining a credential supplied by the auditor, and then granting access if the credential provided by the auditor is determined, such as by one or both of the administrators, to be valid.

When the access request 704 is granted, the auditor may then generate an audit profile 708 that, in general, defines the scope of the blockchain records which the auditor requires for review. The definition of the audit profile 708 may be performed by way of a UI that is associated with the auditing cloud service, and by way of which input may be received from a user. In some instances, the audit profile has already been generated, and the user simply selects, using the UI, the audit profile from a library or displayed list, for example. It should be noted that the UIs referred to herein may be a graphical user interface (GUI), command line interface (CLI), and/or any other UI.

Once the audit profile has been generated 708, it may be transmitted 710 to a blockchain administrator, for example, and, as such, the audit profile may constitute a request from the auditor to access various records registered at the nodes of the blockchain, including the node of the auditing cloud service. The audit profile or request is received 712 by the blockchain administrator which may return 714, or otherwise enable auditor access to, the information embraced by the request. In at least some embodiments, the auditor access 716 to the requested data management transaction information may be limited to read-only, or read/copy.

After the auditor has accessed 716 the requested data management transaction information, the auditor may then process 718 that information. Such processing 718 may include, for example, analyzing the information to determine when one or more particular data management transactions occurred, comparing two or more groups of data, such as backups for example, with each other to determine any commonalities and/or differences between the respective contents of the groups. These examples of processing by the auditor are presented only by way of example however, and are not intended to limit the scope of the invention in any way.

When the auditor has completed processing 718 of the data management transaction information, the auditor may then include the results in a report 720. In other embodiments, the report may be generated by the auditing cloud service. The report can be sent to the enterprise whose data management transaction information was the subject of the audit. The contents of the report may also be used as a basis for the enterprise to identify one or more problems with regard to how the enterprise performs and tracks data management transactions, and to take one or more corrective actions 722 concerning those problems. To illustrate, if the enterprise is found, by the audit, to be retaining personal data, such as of an employee, longer than is permitted, such as by statute or regulation for example, that fact can be identified during the analysis 718 and the enterprise can then modify its backup policies and procedures accordingly to ensure that the data is deleted in a timely fashion.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving, at a blockchain node of an auditing cloud service, data protection transaction information concerning an operation that was performed on data to protect that data, wherein the blockchain node of the auditing cloud service is a node of a blockchain enterprise network, and the data protection transaction information is received by the blockchain node of the auditing cloud service from a data protection system that performed the data protection transaction, and the data protection system is a node of the blockchain enterprise network, and all nodes of the blockchain enterprise network also receive the data protection information;
registering, at all nodes of the blockchain enterprise network, the data protection transaction information received from the data protection system;
receiving from an auditor, by the cloud auditing service, a request for access to the data protection transaction information registered at the blockchain node of the auditing cloud service; and
upon receipt by the cloud auditing service of a valid credential from the auditor, granting, by the cloud auditing service to the auditor, access to the requested data protection transaction information.

2. The method as recited in claim 1, wherein the data protection system is unable to modify the data protection transaction information that has been registered at the blockchain node.

3. The method as recited in claim 1, wherein the blockchain enterprise network does not store the data on which the operation was performed.

4. The method as recited in claim 1, wherein the data protection transaction information comprises a portion of a block that was created as a result of performance of the data protection transaction, and the block is a portion of a blockchain.

5. The method as recited in claim 1, wherein the data protection transaction information comprises metadata generated in connection with performance of the operation.

6. The method as recited in claim 1, wherein the blockchain enterprise network is a private blockchain network.

7. The method as recited in claim 1, wherein the request for access to the data protection transaction information registered at the blockchain node comprises an audit profile specified by the auditor.

8. The method as recited in claim 7, further comprising receiving from a user, at the auditing cloud service, input concerning one or more parameters of the audit profile.

9. The method as recited in claim 7, wherein the audit profile specifies a data protection transaction type, an identity of a data protection system that performed a data protection transaction of the specified type, and a time frame during which the data protection transaction of the specified type was performed.

10. A non-transitory storage medium having stored therein instructions which are executable by one or more hardware processors to perform operations comprising:
receiving, at a blockchain node of an auditing cloud service, data protection transaction information concerning an operation that was performed on data to protect that data, wherein the blockchain node of the auditing cloud service is a node of a blockchain enterprise network, and the data protection transaction information is received by the blockchain node of the auditing cloud service from a data protection system that performed the data protection transaction, and the data protection system is a node of the blockchain enterprise network, and nodes of the blockchain enterprise network also receive the data protection information;
registering, at all nodes of the blockchain enterprise network, the data protection transaction information received from the data protection system;
receiving from an auditor, by the cloud auditing service, a request for access to the data protection transaction information registered at the blockchain node of the auditing cloud service; and
upon receipt by the cloud auditing service of a valid credential from the auditor, granting, by the cloud auditing service to the auditor, access to the requested data protection transaction information.

11. The non-transitory storage medium as recited in claim 10, wherein the data protection system is unable to modify the data protection transaction information that has been registered at the blockchain node.

12. The non-transitory storage medium as recited in claim 10, wherein the blockchain enterprise network does not store the data on which the operation was performed.

13. The non-transitory storage medium as recited in claim 10, wherein the data protection transaction information comprises a portion of a block that was created as a result of performance of the data protection transaction, and the block is a portion of a blockchain.

14. The non-transitory storage medium as recited in claim 10, wherein the data protection transaction information comprises metadata generated in connection with performance of the data operation.

15. The non-transitory storage medium as recited in claim 10, wherein the blockchain enterprise network is a private blockchain network.

16. The non-transitory storage medium as recited in claim 10, wherein the request for access to the data protection transaction information registered at the blockchain node comprises an audit profile specified by the auditor.

17. The non-transitory storage medium as recited in claim 16, wherein the operations further comprise receiving from a user, at the auditing cloud service, input concerning one or more parameters of the audit profile.

18. The non-transitory storage medium as recited in claim 16, wherein the audit profile specifies a data protection transaction type, an identity of a data protection system that performed a data protection transaction of the specified type, and a time frame during which the data protection transaction of the specified type was performed.

* * * * *